US012693956B2

(12) United States Patent
Wang et al.

(10) Patent No.: US 12,693,956 B2
(45) Date of Patent: Jul. 28, 2026

(54) METHOD AND APPARATUS FOR DETERMINING AN INDEX, SERVER, AND MEDIUM

(71) Applicant: Beijing Bytedance Network Technology Co., Ltd., Beijing (CN)

(72) Inventors: Chao Wang, Beijing (CN); Zhichao Yang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/845,346

(22) PCT Filed: Feb. 28, 2023

(86) PCT No.: PCT/CN2023/078651
§ 371 (c)(1),
(2) Date: Sep. 9, 2024

(87) PCT Pub. No.: WO2023/169251
PCT Pub. Date: Sep. 14, 2023

(65) Prior Publication Data
US 2025/0181473 A1 Jun. 5, 2025

(30) Foreign Application Priority Data
Mar. 9, 2022 (CN) .......................... 202210225178.0

(51) Int. Cl.
*G06F 11/34* (2006.01)
*G06F 11/30* (2006.01)

(52) U.S. Cl.
CPC ...... *G06F 11/3419* (2013.01); *G06F 11/3075* (2013.01)

(58) Field of Classification Search
CPC . G06F 11/3419; G06F 11/3075; G06F 16/901
See application file for complete search history.

(56) References Cited

U.S. PATENT DOCUMENTS 8,719,568 B1 5/2014 Antypas, III
10,380,098 B1 8/2019 Marelas
(Continued)

FOREIGN PATENT DOCUMENTS

CN 108156006 A 6/2018
CN 108363657 A 8/2018
(Continued)

OTHER PUBLICATIONS

China National Intellectual Property Administration, Office Action Issued in Application No. 202210225178.0, Apr. 8, 2024, 8 pages.
(Continued)

*Primary Examiner* — Bryce P Bonzo
*Assistant Examiner* — Xinyuan Yu
(74) *Attorney, Agent, or Firm* — Alleman Hall LLP

(57) ABSTRACT

An embodiment of the present disclosure provides a method and apparatus for determining an index, server and medium. The method includes: receiving event information reported by a client at a preset event tracking position, wherein the preset event tracking position includes a start event generation position, a result event generation position and at least one subsequent event generation position corresponding to an index to be determined; performing duplicate removal processing on each piece of event information based on client identifier information in each piece of received event information, and determining a target result execution count and a total execution count corresponding to the index to be determined; and determining an index result corresponding to the index to be determined based on the target result execution count and the total execution count.

16 Claims, 3 Drawing Sheets

(56)                    References Cited

U.S. PATENT DOCUMENTS

| | | | |
|---|---|---|---|
| 2015/0161678 A1 | 6/2015 | Dasdan et al. | |
| 2018/0121515 A1 | 5/2018 | Braksator | |
| 2021/0051166 A1 | 2/2021 | Niazi | |
| 2022/0067055 A1 | 3/2022 | Zhu et al. | |
| 2022/0413953 A1* | 12/2022 | Leu | G06F 11/181 |
| 2023/0244636 A1* | 8/2023 | Russell | G06F 9/5022 |
| | | | 707/694 |
| 2023/0252147 A1* | 8/2023 | Gervais | G06F 21/566 |
| | | | 726/23 |
| 2023/0281097 A1* | 9/2023 | Khaitan | G06F 11/3082 |
| | | | 707/687 |

FOREIGN PATENT DOCUMENTS

| | | | |
|---|---|---|---|
| CN | 110362480 A | 10/2019 | |
| CN | 110781061 A | 2/2020 | |
| CN | 111444072 A | 7/2020 | |
| CN | 112416728 A | 2/2021 | |
| CN | 112527414 A | 3/2021 | |
| CN | 112799925 A | 5/2021 | |
| CN | 113282443 A | 8/2021 | |
| CN | 113472858 A | 10/2021 | |
| CN | 113901153 A | 1/2022 | |
| CN | 114579416 A | 6/2022 | |
| CN | 114579416 B | 5/2024 | |
| WO | 2011023424 A1 | 3/2011 | |
| WO | 2019228011 A1 | 12/2019 | |
| WO | 2021082858 A1 | 5/2021 | |

OTHER PUBLICATIONS

ISA China National Intellectual Property Administration, International Search Report and Written Opinion Issued in Application No. PCT/CN2023/078651, Jun. 8, 2023, WIPO, 10 pages.

* cited by examiner

Receive event information reported by a client at a preset event tracking position, wherein the preset event tracking position includes a start event generation position, a result event generation position and at least one subsequent event generation position corresponding to an index to be determined, and the at least one subsequent event generation position is located behind a target result event generation position matching the index to be determined — S310

Perform duplicate removal processing on the identical event information reported by the identical client based on the client identifier information in each piece of received event information — S320

Determine the target result execution count corresponding to the index to be determined based on target result event information and subsequent event information corresponding to each piece of client identifier information after the duplicate removal processing — S330

Determine the total execution count corresponding to the index to be determined based on the start event information corresponding to each piece of client identifier information after the duplicate removal processing — S340

Determine an index result corresponding to the index to be determined based on the target result execution count and the total execution count — S350

FIG. 3

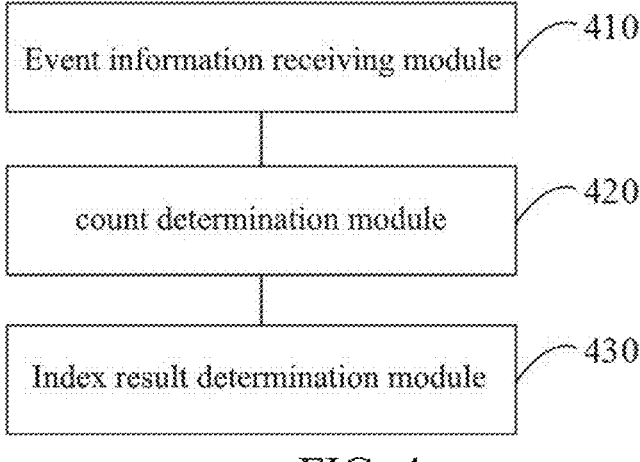

Event information receiving module — 410 count determination module — 420

Index result determination module — 430

FIG. 4

METHOD AND APPARATUS FOR DETERMINING AN INDEX, SERVER, AND MEDIUM

CROSS-REFERENCE TO RELATED APPLICATIONS

The present application is a national stage filing of International Patent Application No. PCT/CN2023/078651, filed on Feb. 28, 2023, which claims priority to Chinese Patent Application No. 202210225178.0, filed with the China National Intellectual Property Administration (CNIPA) on Mar. 9, 2022, which is incorporated herein by reference in its entirety.

TECHNICAL FIELD

Embodiments of the present disclosure relate to the computer technology, e.g., to a method and apparatus for determining an index, a server, and a medium.

BACKGROUND

With the rapid development of the computer technology, user behavior information may be collected by event tracking, and some indexes (such as a room entering success rate index) for reflecting the running performance of an application during running may be determined based on the user behavior information. Thus, the performance of the application may be further optimized based on these indexes.

At present, event tracking is usually performed at generation positions of a start event and a result event corresponding to an index so that an index result can be determined based on the start event and the result event reported by a client. However, in a case where the loss of logs at the client leads to the loss of the result event or a delay in reporting the result event, the determined index may be caused to fluctuate dramatically and the accuracy of the index determination may also be reduced.

SUMMARY

Embodiments of the present disclosure relate to a method and apparatus for determining an index, a server, and a medium so as to improve the accuracy, stability and reliability of index determination in case of the loss of logs or a delay in event reporting.

In a first aspect, an embodiment of the present disclosure provides a method for determining an index, including:

receiving event information reported by a client at a preset event tracking position, wherein the preset event tracking position includes a start event generation position, a result event generation position and at least one subsequent event generation position corresponding to an index to be determined, and the at least one subsequent event generation position is located behind a target result event generation position matching the index to be determined;

performing duplicate removal processing on each piece of event information based on client identifier information in each piece of received event information, and determining a target result execution count and a total execution count corresponding to the index to be determined; and determining an index result corresponding to the index to be determined based on the target result execution count and the total execution count.

In a second aspect, an embodiment of the present disclosure provides an apparatus for determining an index, including:

an event information receiving module, configured to receive event information reported by a client at a preset event tracking position, wherein the preset event tracking position includes a start event generation position, a result event generation position and at least one subsequent event generation position corresponding to an index to be determined, and the at least one subsequent event generation position is located behind a target result event generation position matching the index to be determined;

a count determination module, configured to perform duplicate removal processing on each piece of event information based on client identifier information in each piece of received event information, and determine a target result execution count and a total execution count corresponding to the index to be determined; and an index result determination module, configured to determine an index result corresponding to the index to be determined based on the target result execution count and the total execution count.

In a third aspect, an embodiment of the present disclosure provides a server, including:

one or more processors; and a memory, configured to store one or more programs, wherein the one or more programs, when executed by the one or more processors, cause the one or more processors to implement the method for determining an index provided by any embodiment of the present disclosure.

In a fourth aspect, an embodiment of the present disclosure provides a computer-readable storage medium, storing a computer program, wherein the computer program, when executed by a processor, causes implementing the method for determining an index provided by any embodiment of the present disclosure.

BRIEF DESCRIPTION OF DRAWINGS

Identical or similar reference numerals indicate identical or similar elements throughout the drawings. It will be understood that the drawings are illustrative, and components and elements are not necessarily drawn to scale.

FIG. 3 is a flowchart of a method for determining an index provided by another embodiment of the present disclosure;

FIG. 4 is a structural schematic diagram of an apparatus for determining an index provided by an embodiment of the present disclosure.

DETAILED DESCRIPTION

It will be understood that a plurality of steps described in the method implementations of the present disclosure may be performed in different orders and/or concurrently. In addition, the method implementations may include additional steps and/or the steps shown may be omitted. The scope of the present disclosure is not limited in this aspect.

As used herein, the term "include" and variants thereof are open words and should be construed as "including but not limited to". The term "based on" means "at least in part based on". The term "one embodiment" represents "at least one embodiment"; the term "another embodiment" represents "at least one further embodiment"; and the term "some embodiments" represents "at least some embodiments". The relevant definitions of other terms will be given in the following descriptions.

It needs to be noted that terms such as "first" and "second" are used for distinguishing between different apparatuses, modules or units rather than defining the sequence or interdependent relation of functions performed by such apparatuses, modules or units.

It needs to be noted that terms such as "a/an" and "a plurality of" used herein are illustrative and non-limiting. It will be understood by a person skilled in the art that "a/an" shall be construed as "one or more" unless specified otherwise.

Names of messages or information exchanged between a plurality of apparatuses in embodiments of the present disclosure are only used for the purpose of description and not meant to limit the scope of these messages or information.

Figure 1:
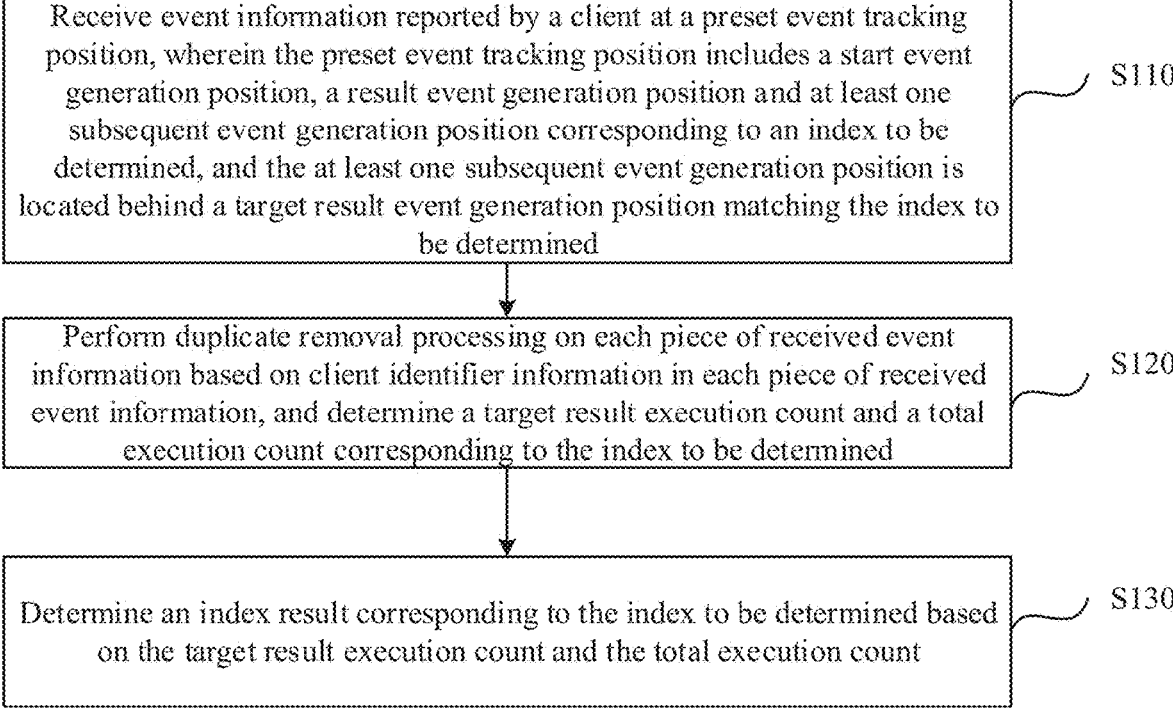
FIG. 1 is a flowchart of a method for determining an index provided by an embodiment of the present disclosure.

FIG. 1 is a flowchart of a method for determining an index provided by an embodiment of the present disclosure. This embodiment is applicable to a case where a user behavior index during the running of an application is determined. The method may be performed by an apparatus for determining an index. The apparatus may be implemented by software and/or hardware, and integrated into a server. As shown in FIG. 1, the method includes the following steps.

At S110, event information reported by a client at a preset event tracking position is received, where the preset event tracking position includes a start event generation position, a result event generation position and at least one subsequent event generation position corresponding to an index to be determined, and the at least one subsequent event generation position is located behind a target result event generation position matching the index to be determined.

The index to be determined may include a success rate index or a failure rate index corresponding to a preset behavior. The success rate index may be a probability that the preset behavior is executed successfully. The failure rate index may be a probability that executing the preset behavior is failed. The preset behavior is a user behavior having a process of a start event and a result event. For example, the preset behavior may refer to a room entering behavior that a user enters a live room. The start event corresponding to the room entering behavior may refer to a room entering request event generated based on a user triggering operation. The result event corresponding to the room entering behavior may be a success result event generated upon successfully entering the live room, or a failure result event generated upon failing to enter the live room.

The start event generation position may refer to a position of the start event generated when the preset behavior starts. The result event generation position may refer to a position of the result event generated when the preset behavior ends. In the embodiments of the present disclosure, the result event generation position may include a success result event generation position and/or a failure result event generation position. If the index to be determined is the success rate index, the target result event generation position matching the index to be determined may refer to the success result event generation position. If the index to be determined is the failure rate index, the target result event generation position matching the index to be determined may refer to the failure result event generation position. The subsequent event generation position may refer to a position of one or more subsequent events generated after a target result event so that whether an execution result of the preset behavior is a target result may be determined indirectly by reporting the subsequent events.

For example, in the embodiments of the present disclosure, event tracking may be performed in advance based on a preset event tracking way, such as a manual event tracking way or an automatic event tracking way, at the start event generation position, the result event generation position and at least one subsequent event generation position corresponding to the index to be determined in each client, at least one subsequent event generation position is located behind the target result event generation position, such that each client reports the generated start event information when the preset behavior starts, reports the generated result event information when the preset behavior ends, and reports each piece of generated subsequent event information upon performing a subsequent operation following the target result event. Thus, the server may receive a plurality of pieces of event information reported by each client.

Figure 2:
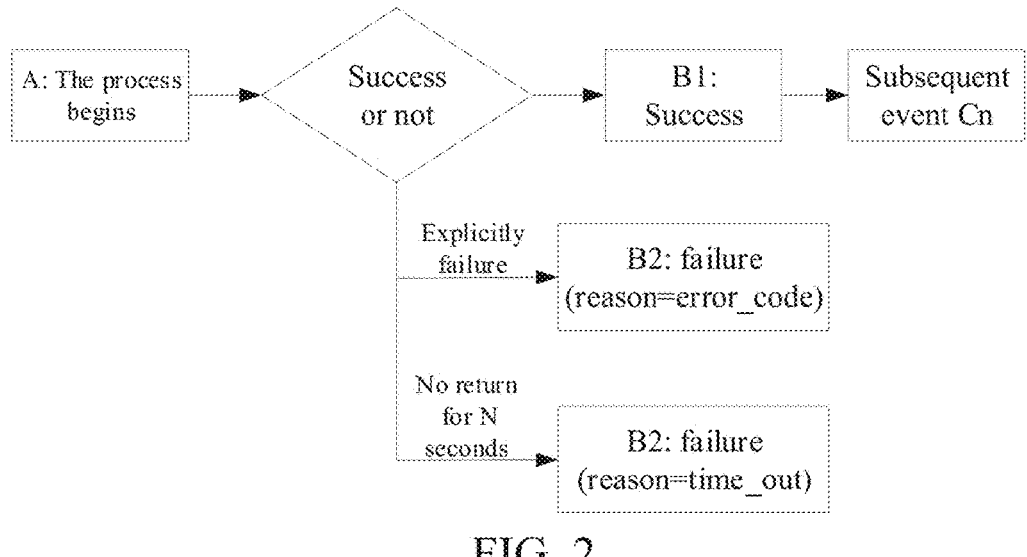
FIG. 2 is an example of an event reporting process involved in an embodiment of the present disclosure.

It needs to be noted that this embodiment may determine a plurality of specific event tracking positions based on a business requirement, the index to be determined, and a specific way of determining the index. For example, FIG. 2 shows an example of an event reporting process. As shown in FIG. 2, when the index to be determined is the success rate index corresponding to the preset behavior, event tracking may be performed at the start event generation position and the success result event generation position corresponding to the preset behavior and at least one subsequent event generation position after success, such that the client reports the generated start event information A when the preset behavior starts, reports the generated success result event information B1 when the preset behavior is successful, and reports the subsequent event information Cn upon performing the subsequent operation after success. Alternatively, event tracking may also be performed at the start event generation position, the success result event generation position and the failure result event generation position corresponding to the preset behavior and at least one subsequent event generation position after success, such that the client may report the start event information A, the success result event information B1, the failure result event information B2, and the subsequent event information Cn after success.

For another example, when the index to be determined is the failure rate index corresponding to the preset behavior, event tracking may be performed at the start event generation position and the failure result event generation position corresponding to the preset behavior and at least one subsequent event generation position after failure, such that the client reports the generated start event information A when the preset behavior starts, reports the generated failure result event information B2 when the preset behavior is failed, and reports the subsequent event information Dn (not shown in FIG. 2) upon performing the subsequent operation after failure. Alternatively, event tracking may also be performed at the start event generation position, the success result event generation position and the failure result event generation position corresponding to the preset behavior and at least one subsequent event generation position after failure, such that the client may report the start event information A, the success result event information B1, the failure result event information B2, and the subsequent event information Dn after failure.

At S120, duplicate removal processing is performed on each piece of received event information based on client identifier information in the each piece of received event information, and a target result execution count and a total execution count corresponding to the index to be determined are determined.

The client identifier information may be used to uniquely identify the client reporting each piece of event information to distinguish between different clients, i.e., distinguish between different users. Different event information sent by the identical client corresponds to the identical client identifier information. The client identifier information may include, but is not limited to, a session identifier session_id. The session identifier may refer to an identifier corresponding to a session created when the client exchanges information with the server. Thus, different event information or the identical event information reported by the identical client may be determined based on the session identifier in the event information. The target result execution count may refer to a count that the execution result of the preset behavior is the target result, i.e., a number of clients for which the execution result of the preset behavior is the target result, such as a count of room entering successes or a count of room entering failures. The total execution count may refer to a count of executing the preset behavior, i.e., a number of clients executing the preset behavior, such as a total room entering count, i.e., a sum of the count of room entering successes and the count of room entering failures.

For example, in case of no loss of logs or no delay in event reporting at the client, the server may receive the event information reported by the client at each preset event tracking position, i.e., receive the start event information, the result event information, and the subsequent event information following the target result reported by the client, and there may be a case where the client reports the identical event information for a plurality of times. Therefore, duplicate removal processing needs to be performed on the identical event information or different event information sent by the identical client based on the client identifier information in each piece of event information, and then the target result execution count and the total execution count corresponding to the index to be determined are determined. In a case where the client does not receive the target result event information due to the loss of logs or has a delay in reporting the target result event information, the client may determine the execution result at this time as the target result upon receiving the subsequent event information following the target result. Thus, in the real-time index determination process, the target result execution count may be determined accurately, avoiding that an actual success result is mistaken as a failure result and then avoiding that the determined target result execution count is less than an actual count. The amplitude of fluctuation of the index result is reduced.

Exemplarily, the server detects whether there is at least one of the target result event information and at least one piece of subsequent event information corresponding to the identical client identifier information based on the client identifier information in each piece of received event information. If there is at least one of the target result event information and the subsequent event information corresponding to the identical client identifier information, it indicates that the result of executing the preset behavior by the client is the target result, and at this time, the target result execution count may be incremented by 1. Thus, the final target result execution count may be determined more timely and accurately. Whether there is at least one of the start event information, the result event information and at least one piece of subsequent event information corresponding to the identical client identifier information is detected. If there is at least one of the start event information, the result event information and at least one piece of subsequent event information corresponding to the identical client identifier information, it indicates that the client executes the preset behavior, and at this time, the total execution count may be incremented by 1. Thus, the final total execution count may be determined more accurately.

At S130, an index result corresponding to the index to be determined is determined based on the target result execution count and the total execution count.

For example, a ratio of the target result execution count to the total execution count may be taken as the index result corresponding to the index to be determined. Thus, in case of the loss of logs or a delay in event reporting, an accurate, stable and timely index is determined, and the accuracy, stability and reliability of index determination are improved.

According to the technical solution of the embodiment of the present disclosure, event tracking is performed in advance at the start event generation position, the result event generation position and at least one subsequent event generation position corresponding to the index to be determined, the at least one subsequent event generation position is located behind the target result event generation position matching the index to be determined, such that each client may report the event information generated at each preset event tracking position, i.e., the start event information, the result event information, and at least one piece of subsequent event information following the target result event. Thus, in the way of reporting the subsequent event information by the client, great fluctuation and inaccuracy of the index result due to the loss of the result event may be avoided. Meanwhile, it is also avoided that an actual success is mistaken as a failure due to a delay in result event reporting. Thus, in case of the loss of logs or a delay in event reporting, an accurate, stable and timely index is determined, and the accuracy, stability and reliability of index determination are improved.

FIG. 3 is a flowchart of a method for determining an index provided by another embodiment of the present disclosure. This embodiment describes the process of determining the target result execution count and the total execution count in detail on the basis of the above embodiment. The explanations of the terms identical to or equivalent to those in the above plurality of embodiments will not be described here repeatedly.

With reference to FIG. 3, the method for determining an index provided by this embodiment includes the following steps.

At S310, event information reported by a client at a preset event tracking position is received, where the preset event tracking position includes a start event generation position, a result event generation position and at least one subsequent event generation position corresponding to an index to be determined, the at least one subsequent event generation position is located behind a target result event generation position matching the index to be determined.

At S320, duplicate removal processing is performed on the identical event information reported by the identical client based on the client identifier information in each piece of received event information.

For example, the server may perform duplicate removal processing on the identical event information reported by the identical client based on the client identifier information in each piece of received event information to delete the identical event information repeatedly reported by the identical client while only retaining different event information reported by the identical client, thereby guaranteeing the accuracy of subsequent count statistics.

At S330, the target result execution count corresponding to the index to be determined is determined based on target result event information and subsequent event information corresponding to each piece of client identifier information after the duplicate removal processing.

For example, for each client, whether there is at least one of the target result event information and the subsequent event information in the event information after the duplicate removal processing may be detected. If yes, it indicates that the result of executing the preset behavior by the client is the target result, and at this time, the target result execution count may be incremented by 1. Thus, in the real-time index determination process, the final target result execution count may be determined timely and accurately, avoiding great index fluctuation and inaccurate determination due to no target result event information being received or a delay in reporting the target result event information.

Exemplarily, S330 may include: performing second duplicate removal processing on the target result event information and the subsequent event information corresponding to the identical client identifier information, determining a quantity of event information after the second duplicate removal processing, and taking the quantity of event information as the target result execution count corresponding to the index to be determined.

For example, if the server receives the target result event information and at least one piece of subsequent event information reported by the identical client, the target result event information and the at least one piece of subsequent event information having the identical client identifier information may be deleted while only retaining one piece of event information corresponding to the client identifier information. If the server receives only one piece of target result event information or one piece of subsequent event information reported by the client, the second duplicate removal processing is not needed. After the second duplicate removal processing is performed on the target result event information and the subsequent event information, the quantity of event information corresponding to the target result event information and the subsequent event information obtained after the second duplicate removal processing is determined and taken as the target result execution count corresponding to the index to be determined. For example, when the index to be determined is the success rate index of the preset behavior, the determined target result execution count (i.e., a success result count) may be expressed as count(distinct([B1||Cn].session_id).

At S340, the total execution count corresponding to the index to be determined is determined based on the start event information corresponding to each piece of client identifier information after the duplicate removal processing.

For example, a quantity of the start event information corresponding to each piece of client identifier information after the duplicate removal processing may be counted, and the counted quantity of event information may be taken as the total execution count corresponding to the index to be determined. For example, when the index to be determined is the success rate index of the preset behavior, the determined total execution count may be expressed as count (distinct([A].session_id).

Exemplarily, S340 may include: determining the total execution count corresponding to the index to be determined based on the start event information, the result event information and the subsequent event information corresponding to each piece of client identifier information after the duplicate removal processing.

For example, for each client, whether there is at least one of the start event information, the result event information and the subsequent event information in the event information after the duplicate removal processing may be detected. If yes, it indicates that the client executes the preset behavior, and at this time, the total execution count may be incremented by 1. Thus, in the real-time index determination process, the final execution result count may be determined more accurately, avoiding inaccurate index determination due to the loss of logs or a delay in reporting event reporting and further guaranteeing the accuracy of index determination.

Exemplarily, determining the total execution count corresponding to the index to be determined based on the start event information, the result event information and the subsequent event information corresponding to each piece of client identifier information after the duplicate removal processing may include: performing second duplicate removal processing on the start event information, the result event information and the subsequent event information corresponding to the identical client identifier information, determining a quantity of event information after the second duplicate removal processing, and taking the quantity of event information after the second duplicate removal processing as the total execution count corresponding to the index to be determined.

For example, the second duplicate removal processing may be performed on the start event information, the result event information and the subsequent event information corresponding to each piece of client identifier information after the duplicate removal processing, and only one piece of event information corresponding to the client identifier information is retained. After the second duplicate removal processing is performed on the start event information, the result event information and the subsequent event information, the quantity of event information obtained after the second duplicate removal processing is determined and taken as the total execution count corresponding to the index to be determined. For example, when the index to be determined is the success rate index of the preset behavior, the determined total execution count may be expressed as count(distinct([A||B1||B2||Cn].session_id).

At S350, an index result corresponding to the index to be determined is determined based on the target result execution count and the total execution count.

For example, when the index to be determined is the success rate index of the preset behavior, the index result may be expressed as count(distinct([B1||Cn].session_id)/ count(distinct([A].session_id), or may be expressed as count (distinct[B1||Cn].session_id)/count(distinct([A||B1||B2||Cn] .session_id).

According to the technical solution of this embodiment, the duplicate removal processing is performed on the identical event information reported by the identical client based on the client identifier information in each piece of received event information, and the target result execution count corresponding to the index to be determined is determined based on the target result event information and the subsequent event information corresponding to each piece of client identifier information after the duplicate removal processing, and the total execution count corresponding to the index to be determined is determined based on the start event information corresponding to each piece of client identifier information after the duplicate removal processing. Great fluctuation and inaccuracy of the index result due to the loss of the result event may be avoided. Meanwhile, it is also avoided that an actual success is mistaken as a failure due to a delay in result event reporting. Thus, in case of the loss of logs or a delay in event reporting, an accurate, stable and timely index is determined, and the accuracy, stability and reliability of index determination are improved.

On the basis of the above technical solution, S330 may include: obtaining time field information in the target result event information corresponding to each piece of client identifier information after the duplicate removal processing; selecting target information of which an elapsed time is less than or equal to a preset elapsed time from the target result event information based on the time field information; and determining the target result execution count corresponding to the index to be determined under the preset elapsed time based on a quantity of the target information.

The target result event information may include one piece of time field information, i.e., elapse field information, for characterizing the elapsed time from starting to ending of the preset behavior. The preset elapsed time may be a maximum elapsed time specified based on a business requirement. The index result under this specified elapsed time is determined, whereby an N-second success rate index or an N-second failure rate index is obtained.

For example, the server may obtain the elapsed time of executing the preset behavior based on the time field information in each piece of target result event information obtained after the duplicate removal processing, and detect whether the elapsed time is less than or equal to the preset elapsed time. If the elapsed time is less than or equal to the preset elapsed time, the target result event information is taken as the target information. Similarly, the target information of which the elapsed time is less than or equal to the preset elapsed time, and the quantity of the target information is taken as the target result execution count corresponding to the index to be determined under the present elapsed time, and the ratio of the target result execution count to the total execution count is taken as the index result of the index to be determined under the preset elapsed time. Thus, the N-second success rate index or the N-second failure rate index may be obtained compatibly to further meet the personalized demand.

The following shows an embodiment of an apparatus for determining an index provided by an embodiment of the present disclosure. The apparatus belongs to the same concept with the method for determining an index in the above embodiments. For details not described in detail in the embodiment of the apparatus for determining an index, a reference may be made to the method for determining an index of the above embodiments.

FIG. 4 is a structural schematic diagram of an apparatus for determining an index provided by an embodiment of the present disclosure. This embodiment is applicable to a case where a user behavior index during the running of an application is determined. As shown in FIG. 4, the apparatus includes an event information receiving module 410, a count determination module 420, and an index result determination module 430.

The event information receiving module 410 is configured to receive event information reported by a client at a preset event tracking position, where the preset event tracking position includes a start event generation position, a result event generation position and at least one subsequent event generation position corresponding to an index to be determined, the at least one subsequent event generation position is located behind a target result event generation position matching the index to be determined. The count determination module 420 is configured to perform duplicate removal processing on each piece of received event information based on client identifier information in the each piece of received event information, and determine a target result execution count and a total execution count corresponding to the index to be determined. The index result determination module 430 is configured to determine an index result corresponding to the index to be determined based on the target result execution count and the total execution count.

According to the technical solution of the embodiment of the present disclosure, event tracking is performed in advance at the start event generation position, the result event generation position and at least one subsequent event generation position corresponding to the index to be determined, the at least one subsequent event generation position is located behind the target result event generation position matching the index to be determined, such that each client may report the event information generated at each preset event tracking position, i.e., the start event information, the result event information, and at least one piece of subsequent event information following the target result event. Thus, in the way of reporting the subsequent event information by the client, great fluctuation and inaccuracy of the index result due to the loss of the result event may be avoided. Meanwhile, it is also avoided that an actual success is mistaken as a failure due to a delay in result event reporting. Thus, in case of the loss of logs or a delay in event reporting, an accurate, stable and timely index is determined, and the accuracy, stability and reliability of index determination are improved.

On the basis of the above technical solution, the index to be determined includes a success rate index or a failure rate index corresponding to a preset behavior; and the client identifier information includes a session identifier.

On the basis of a plurality of technical solutions described above, the count determination module 420 includes:

a duplicate removal processing unit configured to perform duplicate removal processing on the identical event information reported by the identical client based on the client identifier information in each piece of received event information;

a target result execution count determination unit configured to determine the target result execution count corresponding to the index to be determined based on target result event information and subsequent event information corresponding to each piece of client identifier information after the duplicate removal processing; and a total execution count determination unit configured to determine the total execution count corresponding to the index to be determined based on start event information corresponding to each piece of client identifier information after the duplicate removal processing.

On the basis of a plurality of technical solutions described above, the target result execution count determination unit is configured to:

perform second duplicate removal processing on the target result event information and the subsequent event information corresponding to the identical client identifier information, determine a quantity of event information after the second duplicate removal processing, and take the quantity of event information as the target result execution count corresponding to the index to be determined.

On the basis of a plurality of technical solutions described above, the total execution count determination unit is further configured to:

determine the total execution count corresponding to the index to be determined based on the start event information, the result event information and the subsequent event information corresponding to each piece of client identifier information after the duplicate removal processing.

On the basis of a plurality of technical solutions described above, the total execution count determination unit is further configured to:

perform second duplicate removal processing on the start event information, the result event information and the subsequent event information corresponding to the identical client identifier information, determine a quantity of event information after the second duplicate removal processing, and take the quantity of event information as the total execution count corresponding to the index to be determined.

On the basis of a plurality of technical solutions described above, the target result execution count determination unit is further configured to:

obtain time field information in the target result event information corresponding to each piece of client identifier information after the duplicate removal processing; select target information of which an elapsed time is less than or equal to a preset elapsed time from the target result event information based on the time field information; and determine the target result execution count corresponding to the index to be determined under the preset elapsed time based on a quantity of the target information.

The apparatus for determining an index provided in the embodiment of the present disclosure may perform the method for determining an index provided in any embodiment of the present disclosure and has corresponding functional modules for performing the method for determining an index and corresponding beneficial effects.

It should be noted that in the foregoing embodiment of the apparatus for determining an index, the plurality of units and modules included are only divided according to functional logic, but are not limited to the above division, as long as corresponding functions can be implemented. In addition, specific names of the plurality of functional units are merely for the purpose of distinguishing from each other, but are not intended to limit the protection scope of the present disclosure.

Figure 5:
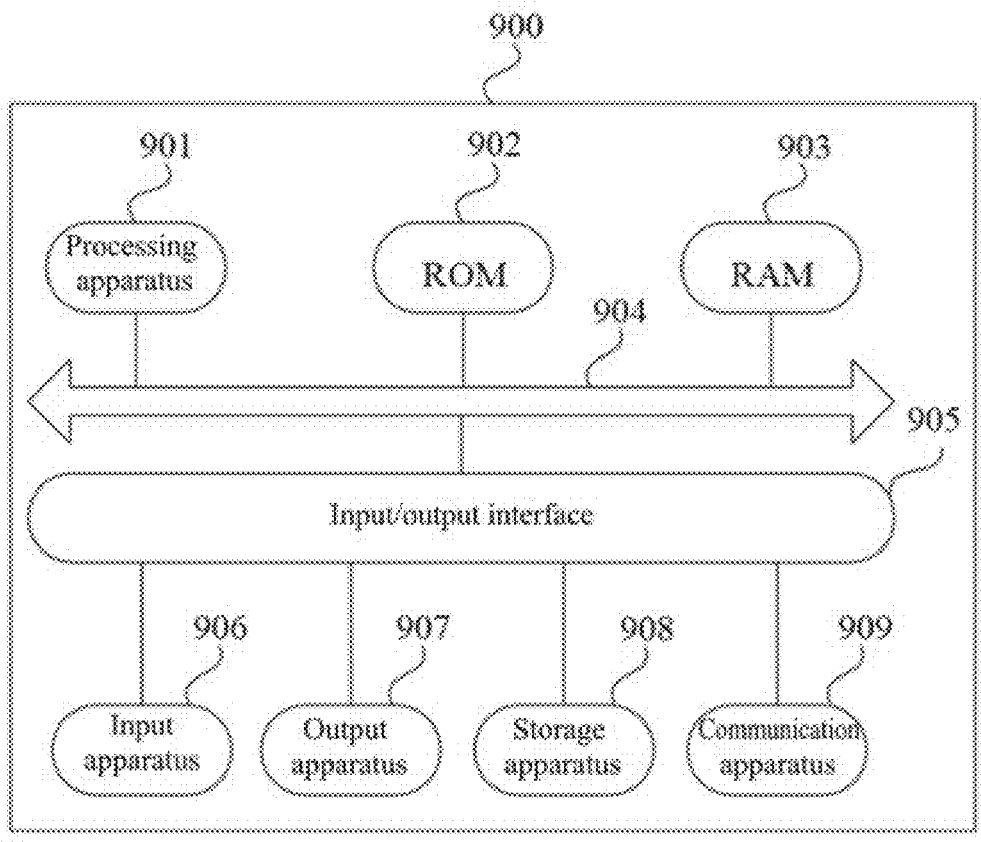
FIG. 5 is a structural schematic diagram of a server provided by an embodiment of the present disclosure.

With reference to FIG. 5, there is shown a structural schematic diagram of a server 900 adapted to implement the embodiments of the present disclosure. The server shown in FIG. 5 is merely an example, and should not impose any limitation to the functions and application range of the embodiments of the present disclosure.

As shown in FIG. 5, the server 900 may include a processing apparatus (e.g., a central processing unit, or a graphics processing unit) 901, which can perform a plurality of suitable actions and processing according to a program stored on a read-only memory (ROM) 902 or a program loaded from a storage apparatus 908 into a random access memory (RAM) 903. The RAM 903 further stores a plurality of programs and data required for operations of the server 900. The processing apparatus 901, the ROM 902, and the RAM 903 are interconnected by means of a bus 904. An input/output (I/O) interface 905 is also connected to the bus 904.

Usually, the following apparatuses may be connected to the I/O interface 905: an input apparatus 906 including, for example, a touch screen, a touch pad, a keyboard, a mouse, a camera, a microphone, an accelerometer, and a gyroscope; an output apparatus 907 including, for example, a liquid crystal display (LCD), a loudspeaker, and a vibrator; a storage apparatus 908 including, for example, a magnetic tape and a hard disk; and a communication apparatus 909. The communication apparatus 909 may allow the server 900 to be in wireless or wired communication with other devices to exchange data. While FIG. 5 illustrates the server 900 having a plurality of apparatuses, it is to be understood that all the illustrated apparatuses are not necessarily implemented or included. More or less apparatuses may be implemented or included alternatively.

According to the embodiments of the present disclosure, the process described above with reference to the flowchart may be implemented as a computer software program. For example, an embodiment of the present disclosure includes a computer program product including a computer program carried by a non-transitory computer-readable medium. The computer program includes a program code for executing the method shown in the flowchart. In such an embodiment, the computer program may be downloaded online through the communication apparatus 909 and installed, or installed from the storage apparatus 908, or installed from the ROM 902. When the computer program is executed by the processing apparatus 901, the functions defined in the method of the embodiments of the present disclosure are executed.

The server provided in the present embodiment of the present disclosure and the method for determining an index provided in the foregoing embodiments belong to the identical concept. For technical details not described in detail in the embodiment of the present disclosure, a reference may be made to the foregoing embodiments, and the embodiment of the present disclosure and the foregoing embodiments have the identical beneficial effects.

An embodiment of the present disclosure provides a computer storage medium on which a computer program is stored. The program, when executed by a processor, causes implementing the method for determining an index provided in the foregoing embodiments.

It needs to be noted that the computer-readable medium described above in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination of them. More specific examples of the computer-readable storage medium may include, but are not limited to: an electrical connection with one or more conducting wires, a portable computer disk, a hard disk, a random access memory (RAM), a read only memory (ROM), an erasable programmable ROM (an EPROM or a flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program, and the program may be used by or in combination with an instruction execution system, apparatus, or device. In the present disclosure, the computer-readable signal medium may include a data signal that propagates in a baseband or as a part of a carrier and carries thereon a computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable storage medium may send, propagate or transmit a program used by or in combination with an instruction execution system, apparatus or device. The program code included on the computer-readable medium may be transmitted by using any suitable medium, including but not limited to an electric wire, a fiber-optic cable, radio frequency (RF) and the like, or any appropriate combination thereof.

In some implementations, a client and a server may communicate by means of any network protocol currently known or to be developed in future such as HyperText Transfer Protocol (HTTP), and may achieve communication and interconnection with digital data (e.g., a communication network) in any form or of any medium. Examples of the communication network include a local area network (LAN), a wide area network (WAN), an Internet work (e.g., the Internet), a peer-to-peer network (e.g., ad hoc peer-to-peer network), and any network currently known or to be developed in future.

The above-mentioned computer-readable medium may be included in the server described above, or may exist alone without being assembled with the server.

The above-mentioned computer-readable medium carries one or more programs which, when executed by the server, cause the server to: receive event information reported by a client at a preset event tracking position, where the preset event tracking position includes a start event generation position, a result event generation position and at least one subsequent event generation position corresponding to an index to be determined, the at least one subsequent event generation position is located behind a target result event generation position matching the index to be determined; perform duplicate removal processing on each piece of received event information based on client identifier information in the each piece of received event information, and determine a target result execution count and a total execution count corresponding to the index to be determined; and determine an index result corresponding to the index to be determined based on the target result execution count and the total execution count.

A computer program code for performing the operations in the present disclosure may be written in one or more programming languages or a combination thereof. The programming languages include but are not limited to object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer via any type of network, including a local area network (LAN) or a wide area network (WAN), or may be connected to an external computer (for example, connected via the Internet by using an Internet service provider).

The flowcharts and block diagrams in the accompanying drawings illustrate system architectures, functions and operations that may be implemented by the system, method and computer program product according to a plurality of embodiments of the present disclosure. In this regard, each block in the flowcharts or block diagrams may represent a module, a program segment or a part of code, and the module, the program segment or the part of code includes one or more executable instructions for implementing specified logic functions. It should also be noted that in some alternative implementations, the functions marked in the blocks may alternatively occur in a different order from that marked in the drawings. For example, two successively shown blocks actually may be executed in parallel substantially, or may be executed in reverse order sometimes, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Related units described in the embodiments of the present disclosure may be implemented by software, or may be implemented by hardware. The name of a unit does not constitute a limitation on the unit itself. For example, an editable content display unit may also be described as "an editing unit".

The functions described above in this specification may be at least partially performed by one or more hardware logic components. For example, exemplary types of hardware logic components that can be used without limitations include a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium that may include or store a program for use by or in combination with an instruction execution system, apparatus or device. The machine-readable medium may be a machine-readable signal medium or a machine-readable storage medium. The machine-readable medium may include but be not limited to an electronic, magnetic, optical, electromagnetic, infrared, or semiconductor system, apparatus or device, or any appropriate combination thereof. More specific examples of the machine-readable storage medium include: an electrical connection with one or more wires, a portable computer disk, a hard disk, a random access memory (RAM), a read-only memory (ROM), an erasable programmable ROM (an EPROM or a flash memory), an optical fiber, a portable compact disc read-only memory (CD-ROM), an optical storage device, a magnetic storage device, or any suitable combination thereof.

According to one or more embodiments of the present disclosure, [Example 1] provides a method for determining an index, including:

receiving event information reported by a client at a preset event tracking position, wherein the preset event tracking position includes a start event generation position, a result event generation position and at least one subsequent event generation position corresponding to an index to be determined, and the at least one subsequent event generation position is located behind a target result event generation position matching the index to be determined;

performing duplicate removal processing on each piece of event information based on client identifier information in each piece of received event information, and determining a target result execution count and a total execution count corresponding to the index to be determined; and determining an index result corresponding to the index to be determined based on the target result execution count and the total execution count.

According to one or more embodiments of the present disclosure, [Example 2] provides a method for determining an index, wherein the index to be determined includes a success rate index or a failure rate index corresponding to a preset behavior, and the client identifier information includes a session identifier.

According to one or more embodiments of the present disclosure, [Example 3] provides a method for determining an index, wherein the performing duplicate removal processing on each piece of event information based on client identifier information in each piece of received event information, and determining a target result execution count and a total execution count corresponding to the index to be determined include:

performing duplicate removal processing on an identical event information reported by an identical client based on the client identifier information in the each piece of received event information;

determining the target result execution count corresponding to the index to be determined based on target result event information and subsequent event information corresponding to each piece of client identifier information after the duplicate removal processing; and determining the total execution count corresponding to the index to be determined based on start event information corresponding to each piece of client identifier information after the duplicate removal processing.

According to one or more embodiments of the present disclosure, [Example 4] provides a method for determining an index, wherein the determining the target result execution count corresponding to the index to be determined based on target result event information and subsequent event information corresponding to each piece of client identifier information after the duplicate removal processing includes:

performing second duplicate removal processing on the target result event information and the subsequent event information corresponding to identical client identifier information, determining a quantity of event information after the second duplicate removal processing, and taking the quantity of event information after the second duplicate removal processing as the target result execution count corresponding to the index to be determined.

According to one or more embodiments of the present disclosure, [Example 5] provides a method for determining an index, wherein the determining the total execution count corresponding to the index to be determined based on start event information corresponding to each piece of client identifier information after the duplicate removal processing includes:

determining the total execution count corresponding to the index to be determined based on the start event information, the result event information and the subsequent event information corresponding to the each piece of client identifier information after the duplicate removal processing.

According to one or more embodiments of the present disclosure, [Example 6] provides a method for determining an index, wherein the determining the total execution count corresponding to the index to be determined based on the start event information, the result event information and the subsequent event information corresponding to the each piece of client identifier information after the duplicate removal processing includes:

performing second duplicate removal processing on the start event information, the result event information and the subsequent event information corresponding to identical client identifier information, determining a quantity of event information after the second duplicate removal processing, and taking the quantity of event information after the second duplicate removal processing as the total execution count corresponding to the index to be determined.

According to one or more embodiments of the present disclosure, [Example 7] provides a method for determining an index, wherein the determining the target result execution count corresponding to the index to be determined based on target result event information and subsequent event information corresponding to each piece of client identifier information after the duplicate removal processing includes:

obtaining time field information in the target result event information corresponding to the each piece of client identifier information after the duplicate removal processing;

selecting target information of which an elapsed time is less than or equal to a preset elapsed time from the target result event information based on the time field information; and determining the target result execution count corresponding to the index to be determined under the preset elapsed time based on a quantity of the target information.

According to one or more embodiments of the present disclosure, [Example 8] provides an apparatus for determining an index including an event information receiving module, a count determination module and an index result determination module.

the event information receiving module is configured to receive event information reported by a client at a preset event tracking position, wherein the preset event tracking position includes a start event generation position, a result event generation position and at least one subsequent event generation position corresponding to an index to be determined, and the at least one subsequent event generation position is located behind a target result event generation position matching the index to be determined;

the count determination module is configured to perform duplicate removal processing on each piece of event information based on client identifier information in each piece of received event information, and determine a target result execution count and a total execution count corresponding to the index to be determined; and the index result determination module is configured to determine an index result corresponding to the index to be determined based on the target result execution count and the total execution count.

In addition, while a plurality of operations have been described in a particular order, it shall not be construed as requiring that such operations are performed in the stated specific order or sequence. Under given conditions, multitasking and parallel processing may be advantageous. Similarly, although several specific implementation details are included in the above discussion, these specific implementation details should not be interpreted as limiting the scope of the present disclosure. Some features described in the context of a separate embodiment may also be combined in a single embodiment. Rather, a plurality of features described in the context of a single embodiment may also be implemented separately or in any appropriate sub-combination in a plurality of embodiments.

What is claimed is:

1. A method for determining an index, comprising:

receiving and storing event information into a memory, wherein the event information is reported by a plurality of clients using an application at a preset event tracking position, the preset event tracking position comprises a start event generation position, a result event generation position and at least one subsequent event generation position corresponding to an index to be determined, and the at least one subsequent event generation position is located behind a first result event generation position matching the index to be determined;

performing, by a server, duplicate removal processing on each piece of event information based on client identifier information in each piece of received event information, and determining a result execution count and a total execution count corresponding to the index to be determined, wherein the client identifier information comprises a session identifier corresponding to a session created when a client performs information interaction with the server;

determining an index result corresponding to the index to be determined based on the result execution count and the total execution count, wherein the index result is used to characterize a running performance of the application; and optimizing the application based on the index result, wherein performing, by a server, duplicate removal processing on each piece of event information based on client identifier information in each piece of received event information, and determining a result execution count and a total execution count corresponding to the index to be determined, comprises:

extracting, by the server, client identification information from each piece of event information received; identifying, by the server, duplicate event information reported by a same client; deleting, by the server, duplicate data; and caching, by the server, first event information after performing the duplicate removal processing;

retrieving or filtering, by the server, the first event information by using the session identifier, so as to determine the result execution count corresponding to the index to be determined based on first result event information and subsequent event information corresponding to each piece of client identifier information in the first event information;

determining, by the server, the total execution count corresponding to the index to be determined based on start event information corresponding to each piece of client identifier information after the duplicate removal processing.

2. The method according to claim 1, wherein the index to be determined comprises a success rate index or a failure rate index corresponding to a preset behavior.

3. The method according to claim 1, wherein the determining the result execution count corresponding to the index to be determined based on first result event information and subsequent event information corresponding to each piece of client identifier information in the first event information comprises:

performing second duplicate removal processing on the first result event information and the subsequent event information corresponding to identical client identifier information, determining a quantity of event information after the second duplicate removal processing, and taking the quantity of event information after the second duplicate removal processing as the result execution count corresponding to the index to be determined.

4. The method according to claim 1, wherein the determining, by the server, the total execution count corresponding to the index to be determined based on start event information corresponding to each piece of client identifier information after the duplicate removal processing comprises:

determining, by the server, the total execution count corresponding to the index to be determined based on the start event information, result event information and the subsequent event information corresponding to each piece of client identifier information after the duplicate removal processing.

5. The method according to claim 4, wherein the determining, by the server, the total execution count corresponding to the index to be determined based on the start event information, result event information and the subsequent event information corresponding to each piece of client identifier information after the duplicate removal processing comprises:

performing, by the server, second duplicate removal processing on the start event information, the result event information and the subsequent event information corresponding to identical client identifier information, determining a quantity of event information after the second duplicate removal processing, and taking the quantity of event information after the second duplicate removal processing as the total execution count corresponding to the index to be determined.

6. The method according to claim 1, wherein the determining the result execution count corresponding to the index to be determined based on first result event information and subsequent event information corresponding to each piece of client identifier information in the first event information comprises:

obtaining time field information in the first result event information corresponding to each piece of client identifier information after the duplicate removal processing;

selecting first information of which elapsed time is less than or equal to preset elapsed time from the first result event information based on the time field information; and determining the result execution count corresponding to the index to be determined under the preset elapsed time based on a quantity of the first information.

7. A server, comprising:

one or more processors; and a memory, configured to store one or more programs, wherein the one or more programs, when executed by the one or more processors, cause the one or more processors to implement a method for determining an index, the method comprising:

receiving and storing event information into the memory, wherein the event information is reported by a plurality of clients using an application at a preset event tracking position, the preset event tracking position comprises a start event generation position, a result event generation position and at least one subsequent event generation position corresponding to an index to be determined, and the at least one subsequent event generation position is located behind a first result event generation position matching the index to be determined;

performing duplicate removal processing on each piece of event information based on client identifier information in each piece of received event information, and determining a result execution count and a total execution count corresponding to the index to be determined, wherein the client identifier information comprises a session identifier corresponding to a session created when a client performs information interaction with the server;

determining an index result corresponding to the index to be determined based on the result execution count and the total execution count, wherein the index result is used to characterize a running performance of the application; and optimizing the application based on the index result, wherein performing, by a server, duplicate removal processing on each piece of event information based on client identifier information in each piece of received event information, and determining a result execution count and a total execution count corresponding to the index to be determined, comprises:

extracting, by the server, client identification information from each piece of event information received; identifying, by the server, duplicate event information reported by a same client; deleting, by the server, duplicate data; and caching, by the server, first event information after performing the duplicate removal processing;

retrieving or filtering, by the server, the first event information by using the session identifier, so as to determine the result execution count corresponding to the index to be determined based on first result event information and subsequent event information corresponding to each piece of client identifier information in the first event information;

determining, by the server, the total execution count corresponding to the index to be determined based on start event information corresponding to each piece of client identifier information after the duplicate removal processing.

8. A non-transitory computer-readable storage medium, storing a computer program, wherein the computer program, when executed by a processor, causes implementing of a method for determining an index, the method comprising:

receiving and storing event information into a memory, wherein the event information is reported by a plurality of clients using an application at a preset event tracking position, the preset event tracking position comprises a start event generation position, a result event generation position and at least one subsequent event generation position corresponding to an index to be determined, and the at least one subsequent event generation position is located behind a first result event generation position matching the index to be determined;

performing, by a server, duplicate removal processing on each piece of event information based on client identifier information in each piece of received event information, and determining a result execution count and a total execution count corresponding to the index to be determined, wherein the client identifier information comprises a session identifier corresponding to a session created when a client performs information interaction with the server;

determining an index result corresponding to the index to be determined based on the result execution count and the total execution count, wherein the index result is used to characterize a running performance of the application; and optimizing the application based on the index result, wherein performing, by a server, duplicate removal processing on each piece of event information based on client identifier information in each piece of received event information, and determining a result execution count and a total execution count corresponding to the index to be determined, comprises:

extracting, by the server, client identification information from each piece of event information received; identifying, by the server, duplicate event information reported by a same client; deleting, by the server, duplicate data; and caching, by the server, first event information after performing the duplicate removal processing;

retrieving or filtering, by the server, the first event information by using the session identifier, so as to determine the result execution count corresponding to the index to be determined based on first result event information and subsequent event information corresponding to each piece of client identifier information in the first event information;

determining, by the server, the total execution count corresponding to the index to be determined based on start event information corresponding to each piece of client identifier information after the duplicate removal processing.

9. The server according to claim 7, wherein the index to be determined comprises a success rate index or a failure rate index corresponding to a preset behavior.

10. The server according to claim 7, wherein the result execution count corresponding to the index to be determined based on first result event information and subsequent event information corresponding to each piece of client identifier information in the first event information comprises:

performing second duplicate removal processing on the first result event information and the subsequent event information corresponding to identical client identifier information, determining a quantity of event information after the second duplicate removal processing, and taking the quantity of event information after the second duplicate removal processing as the result execution count corresponding to the index to be determined.

11. The server according to claim 7, wherein the determining the total execution count corresponding to the index to be determined based on start event information corresponding to each piece of client identifier information after the duplicate removal processing comprises:

determining the total execution count corresponding to the index to be determined based on the start event information, result event information and the subsequent event information corresponding to each piece of client identifier information after the duplicate removal processing.

12. The server according to claim 11, wherein the determining the total execution count corresponding to the index to be determined based on the start event information, result event information and the subsequent event information corresponding to each piece of client identifier information after the duplicate removal processing comprises:

performing second duplicate removal processing on the start event information, the result event information and the subsequent event information corresponding to identical client identifier information, determining a quantity of event information after the second duplicate removal processing, and taking the quantity of event information after the second duplicate removal processing as the total execution count corresponding to the index to be determined.

13. The server according to claim 7, wherein the determining the result execution count corresponding to the index to be determined based on first result event information and subsequent event information corresponding to each piece of client identifier information in the first event information comprises:

obtaining time field information in the first result event information corresponding to each piece of client identifier information after the duplicate removal processing;

selecting first information of which elapsed time is less than or equal to preset elapsed time from the first result event information based on the time field information; and determining the result execution count corresponding to the index to be determined under the preset elapsed time based on a quantity of the first information.

14. The non-transitory computer-readable storage medium according to claim 8, wherein the index to be determined comprises a success rate index or a failure rate index corresponding to a preset behavior.

15. The non-transitory computer-readable storage medium according to claim 8, wherein the determining the result execution count corresponding to the index to be determined based on first result event information and subsequent event information corresponding to each piece of client identifier information in the first event information comprises:

performing second duplicate removal processing on the first result event information and the subsequent event information corresponding to identical client identifier information, determining a quantity of event information after the second duplicate removal processing, and taking the quantity of event information after the second duplicate removal processing as the result execution count corresponding to the index to be determined.

16. The non-transitory computer-readable storage medium according to claim 8, wherein the determining the total execution count corresponding to the index to be determined based on start event information corresponding to each piece of client identifier information after the duplicate removal processing comprises:

determining the total execution count corresponding to the index to be determined based on the start event information, result event information and the subsequent event information corresponding to each piece of client identifier information after the duplicate removal processing.

* * * * *